F. J. OLSEN.
FREE WHEEL HUB.
APPLICATION FILED NOV. 4, 1911.
1,249,657.
Patented Dec. 11, 1917.
3 SHEETS—SHEET 1.
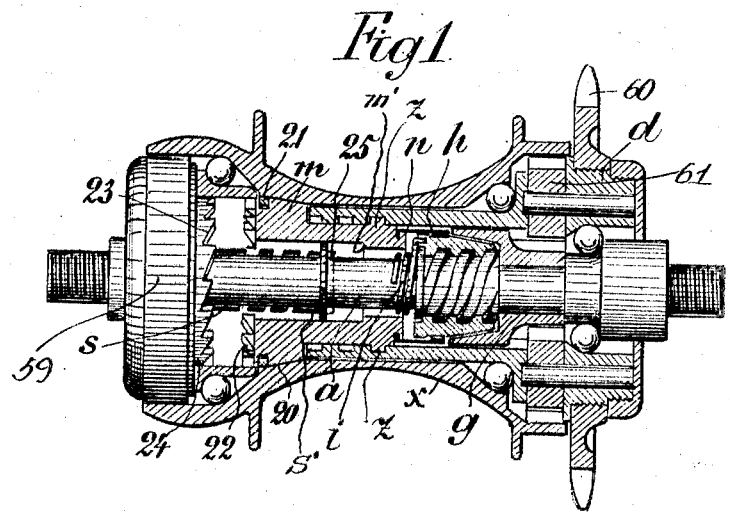
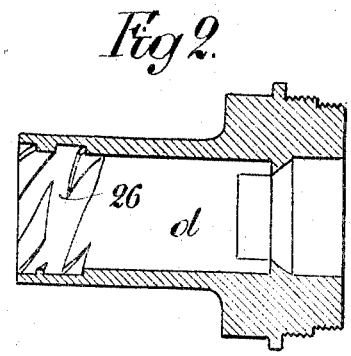
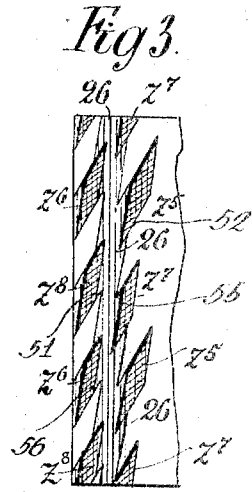
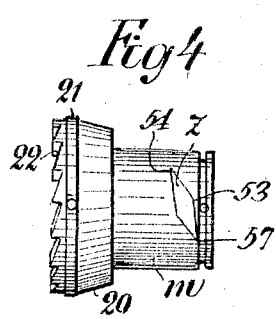
Witnesses
Inventor
Frederick J. Olsen
by B. Singer
Atty

F. J. OLSEN.
FREE WHEEL HUB.
APPLICATION FILED NOV. 4, 1911.

1,249,657.

Patented Dec. 11, 1917.
3 SHEETS—SHEET 2.

Witnesses

Inventor
Frederik J. Olsen
by B. Singer
Atty

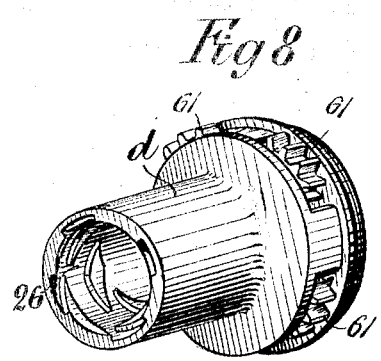
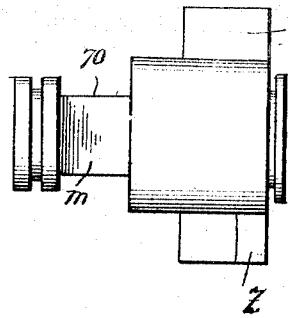
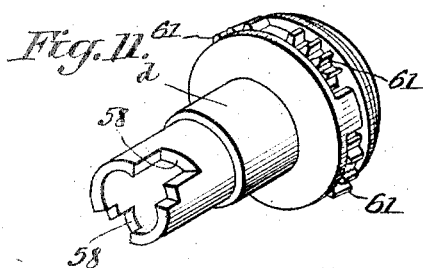
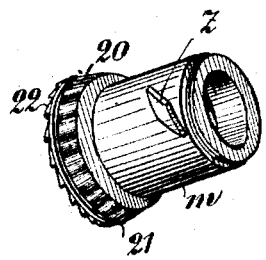
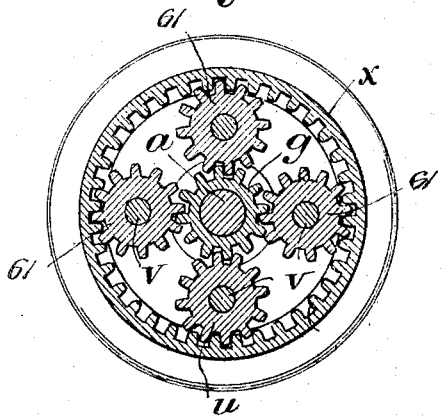
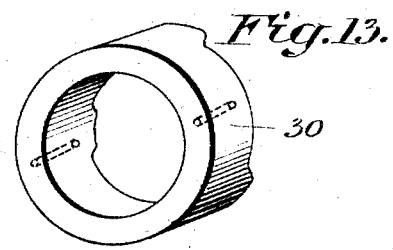

UNITED STATES PATENT OFFICE.

FREDERIK JOHANNES OLSEN, OF ESKEBJERGGAARD PER SVEBÖLLE, DENMARK.

FREE-WHEEL HUB.

1,249,657.  Specification of Letters Patent.  Patented Dec. 11, 1917.

Application filed November 4, 1911. Serial No. 658,624.

*To all whom it may concern:*

Be it known that I, FREDERIK JOHANNES OLSEN, a subject of the King of Denmark, residing at Eskebjerggaard per Svebölle, Denmark, have invented certain new and useful Improvements in Free-Wheel Hubs, of which the following is a specification.

In an application filed November 4, 1911, Serial No. 658,622, I have described a free wheel hub with a two speed gearing in which the change from one speed to the other is effected by back pedaling, but in which the change in transmission ratio can only be effected when the braking has commenced. According to the present invention, it is now also possible to change the ratio of transmission of the apparatus without braking taking place.

In the annexed drawing I have shown two modifications of hub embodying my present invention, in both of which the change in the transmission ratio is effected by retaining the position of a body or member which is displaceable also in the longitudinal direction of the hub, in one modification the retaining or restraining of the said member being effected by means of a friction spring, while in the other modification the retaining or restraining of the said body or member is effected by friction rolls or coupling rolls engaging the inner surface of the outer hub casing.

In the attached drawing:

Figure 1 shows a sectional view of the first named modification.

Fig. 2 is a longitudinal section of the inner hub casing shown in Fig. 1.

Fig. 3 is a development of part of the inner surface of the inner hub casing shown in Fig. 2.

Fig. 4 is an elevational view of the longitudinally displaceable body or member previously referred to and which is hereinafter referred to as a sleeve.

Fig. 8 is a perspective view of the inner hub casing used with the form shown in Fig. 1.

Fig. 9 is a perspective view of the elements shown in elevation in Fig. 4.

Fig. 10 is a sectional view through the planetary gearing shown in Fig. 1.

Fig. 11 is an elevational view of the inner hub casing in the form shown in Fig. 5.

Fig. 12 is a perspective view of the longitudinally adjustable sleeve used in the form shown in Fig. 5.

Fig. 13 is a perspective view of the roll retaining ring shown in Fig. 5.

Figure 5:
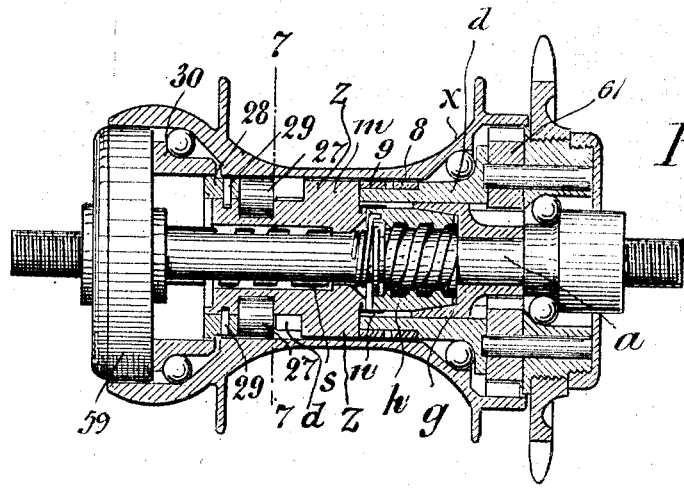
Fig. 5 is a sectional view of the second modification.

Referring more particularly to the drawings, the outer hub casing and its appurtenant parts, are essentially of the same construction as those of known hubs. The complete apparatus comprises a central stationary axle $a$, an outer hub casing $x$, an inner hub casing $d$ which carries the sprocket wheel 60 and the planetary wheels or gears 61, a sun gear $g$ loose on the shaft $a$, as well as a longitudinally adjustable and rotatable sleeve $m$, and other parts hereinafter referred to more specifically. The sleeve $m$ is, moreover, provided with a conical surface 20, which co-acts with a corresponding surface in the outer hub casing. Between these two parts is disposed a friction spring 21 of well known form. The sleeve $m$ on its left end is provided with coupling teeth 22, which can be thrown into and out of engagement with corresponding teeth 23 on the brake actuating member 24, and this sleeve has an internal shoulder $m'$ adapted to engage with a washer $s'$ slidable on the axle $a$. Washer $s'$ is pressed toward the right as viewed in Fig. 1 by spring $s$, but axle $a$ has a pin 25 which stops the washer $s'$ in such a position that normally, the shoulder $m'$ and the washer are out of engagement. The sleeve $m$ is also provided with two projections $z$, which in the present modifications are parallelogrammatic in form as shown in Fig. 4. The grooves co-acting with the same on the inner surface of the inner hub casing $d$ have a pointed shape, as shown in Figs. 2 and 3, the grooves being shown hatched in Fig. 3. The spring $s$, Fig. 1, is in its motion limited by pin 25 so as to actuate the sleeve $m$ only after the sleeve has performed part of its displacement toward the left as shown in Fig. 1. At its right hand end, also as shown in Fig. 1, the sleeve $m$ has an annular groove in which is fixed a friction sleeve $n$ which projects to the right and frictionally engages the surface of a column like clutch member or sleeve $h$. The member $h$ is provided with interior threads by which it is adapted to screw onto the worm threads shown in Fig. 1, which are fast to the fixed shaft $a$. The right hand end of member $h$ is tapered, adapting it to frictionally engage and hold the outwardly tapering flange-like portion which projects from the left end of the sun gear $g$. When the sleeve $m$ is in one of its right hand positions, the friction sleeve or ring $n$ does not engage the clutch member $h$, but when the sleeve $m$ is in its other right hand position, the right hand portion of the ring $n$ engages the flange at the left hand of the member $h$ so that the friction ring $n$ obtains firm engagement with the member $h$ and is enabled to turn the same on the central worm.

I provide also a spring $i'$ coiled around the shaft or axle $a$ for unscrewing the member $h$ on the worm as soon as the engagement between $h$ and $d$ has been loosened by the action by the planetary gears when the pedals are held stationary. Referring to Fig. 3, the apparatus is adapted to drive forward at one speed when the projections $z$ are in position indicated at $z^5$ and to drive forward when the projections $z$ are in the position indicated at $z^7$. The position indicated at $z^5$ is the direct driving.

The hub shown in Fig. 1 acts in the following manner:

When the inner hub casing $d$, which carries the sprocket wheel 60 and the planetary gears 61, is turned forward, the outer hub casing is, when the parts are in the position shown in Fig. 1, driven forward by means of the sleeve $m$ and the concial surface 20, the projections $z$ being in one of the positions $z^5$ indicated in Fig. 3 so that they transmit the thrust. The clutch member $h$ is out of contact with the friction ring or spring $n$ and the sun gear $g$ is running freely on the fixed shaft $a$. If now back pedaling is effected, whereby the inner hub casing $d$ is turned backwardly, then the projections $z$ will slide from the position $z^5$ to the position $z^6$ through the connecting grooves 26, and thereby the sleeve $m$ will be displaced in the longitudinal direction, so that the friction between the conical surfaces terminates. As back pedaling continues the path of the projections $z$ just described is determined by the relative size and proportions of the projections $z$ as compared with the recesses $z^5$, $z^6$, $z^7$ and $z^8$, as well as the form of the passage 26. For instance, as a projection $z$ leaves the recess $z^5$ during back pedaling, the projection moves in contact with the edge of the recess until the shoulder 53 on the projection arrives at the point 52, where the recess $z^5$ merges into the passage 26. Now the proportions of this projection $z$ are such that when the shoulder 53 is at the point mentioned, the point 54 on the projection will lie in the passage 26. The portion of the projection $z$ between points 53 and 57 will now engage that portion of the passage 26 lying between the points 52 and 55, and it will be seen that the axial inclination of these surfaces is relatively slight. Consequently, further back pedaling causes the projection $z$ to slide along the passage 26 until the point 57 on the projection $z$ arrives at the point 55 at the mouth of the recess $z^7$. In this position of the parts, it will be seen that the projection $z$ and the recesses are so formed that the point 54 lies in the mouth of the recess $z^6$ so that the motion of back pedaling causes the point 54 to catch on the point 56 and be guided into the recess $z^6$ instead of sliding farther along the passage 26 and teeth 22 and 23 come into engagement. On further back pedaling the brake comes into activity, but on forward pedaling the projections $z$ will, actuated by the springs, pass from the position $z^6$ to the position $z^7$. The frictional surface 20 is not now in contact with the outer hub casing, and the spring friction ring $n$ actuates the sleeve $h$ by friction in such a direction as to force the sleeve against the sun gear, whereby the cone clutch member $h$ is turned on the central worm in such a direction that it is forced against the sun gear $g$ and firmly grips the same and the gear $g$ is coupled to the shaft $a$, thus changing the ratio of transmission. If back pedaling is again effected the projections $z$ will now slide from the position $z^7$ to the position $z^8$, and the braking will again be effected on further back pedaling. If now forward pedaling is effected the projections $z$ will by reason of the spring $s$, slide back into position $z^5$, since the sleeve $m$ moves sufficiently far to the left from the position shown in Fig. 1 to tension the spring $s$ when the projection $z$ moves into the passage 26. The friction spring 21 effects the displacement of the sleeve $m$, since upon back pedaling the outer hub casing continues to run forward and the sleeve $m$ consequently tends to revolve owing to engagement between spring 21 and the outer hub, the movement of revolution being translated into an axial movement by the effect of the inclined sides of the recesses $z^5$, $z^6$, $z^7$ and $z^8$ as previously described.

Free running without pedaling can, of course, be resorted to at any time when the direct drive corresponding to the position $z^5$ of the projection $z$ is being used without any mechanical provision being necessary therefor. However, when the parts are in the position corresponding to $z^7$ if the pedals are dropped, the motion of the hub actuates the planetary gears 61 so as to turn the sun gear $g$ in the direction to slightly unscrew $h$ on its worm thus loosening $h$ from $g$. The coil spring $i$, which is fixed to shaft $a$ at one end and to part $h$ at the other end then comes into play and turns $h$ to back it away from $g$.

Figure 6:
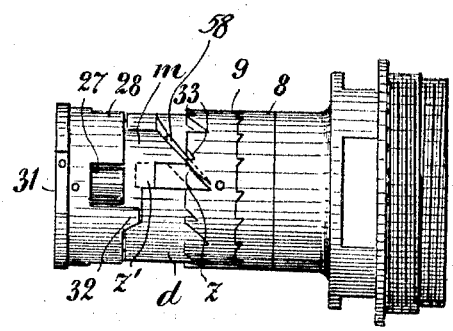
Fig. 6 is an elevational view of the inner hub casing used in the form shown in Fig. 5.
Figure 7:
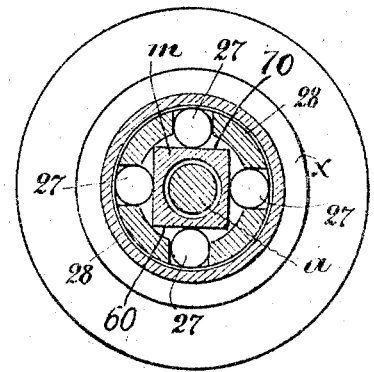
Fig. 7 is a section on the line 7—7 of Fig. 5.

The difference between the modification shown in Figs. 5 and 7 and the modification described above is that the friction spring 21 between the coupling sleeve $m$ and the outer hub casing is omitted and rolls 27 are provided arranged in cavities in the sleeve $m$, this sleeve having a square cross-section at the place where the rolls are located, as will be seen from Fig. 7. The sleeve $m$ is surrounded by a ring 28 which is likewise provided with cavities for the rolls 27, and the ring 28 is prevented from axial displacement in relation to the sleeve $m$ by means of pins 29 entering into a groove in the said sleeve, while a relative turning can take place between the ring and the sleeve. 30 is a ring for effecting the braking, and the ring 28 is provided with a friction spring 31 co-acting with the inner surface of the ring 30, to retard the hub. The ring 28 is, on its right end, provided with a projection 32 which can co-act with a notch 58 in the end of the inner hub casing $d$. Said notch 58 has one edge substantially parallel to the axis of the central fixed shaft $a$ and its other edge inclined to said axis, as clearly shown in Fig. 6. It will be seen also that in Figs. 5 and 6 the left end of the hub $d$ is turned down so as to accommodate two rings 8 and 9 which are provided with interlocking teeth. The ring 8 is fixed to the hub $d$ while the ring 9 is capable of a sliding motion thereon and it will be seen from Fig. 6 that the teeth on these two rings are so arranged that the ring 9 may slide backward onto ring 8 when the inner hub $d$ is being turned forward, but will be positively moved backward with the ring 8 when the hub $d$ is being turned backward as in back pedaling. It will also be seen that the left hand edge of the ring 9 is provided with a set of notches 33, alternate notches being of less depth than the others. These notches 33 have one edge substantially parallel to the axis of the central fixed shaft $a$, while the other edge inclines forwardly, giving a general V-shape and providing a number of oblique surfaces which are adapted to coöperate with the inclined surfaces of the projections $z$ in a manner hereinafter described. Otherwise the hub $d$ in the second modification is similar to what it is in the first. Moreover, the spring sleeve or friction ring $n$ in the second modification is fixed to the sleeve $m$ in the same manner as in the previously described form. However, in this modification the spring $n$ is relatively short in its axial dimension and is arranged to frictionally engage the cylindrical surface of the cone member $h$ only when sleeve $m$ is in its right hand position as shown in Fig. 5. In this particular, it will be seen that the form shown in Fig. 5 operates exactly opposite to the form shown in Fig. 1, since in the latter form the frictional spring ring $n$ engages the coupling member $h$ only when the friction ring is in the left hand position. The other parts of the hub according to the second modification correspond exactly to the corresponding parts of the modification first described with the exception that the pin 25, Fig. 1, limiting the motion of the spring $s$, is not found in the second modification.

The second modification shown in Fig. 5 acts in the following manner:

In the position of the hub shown in Fig. 5, the gearing is in operation, and the running takes place at the highest speed. The rolls 27 are held in their central position by the projection 32 on the ring 28 resting against the edge of the notch in the inner hub casing $d$, as seen from Fig. 6, the friction spring 31 keeping the projection 32 against the surface in question on the inner hub casing $d$, the friction spring 31 sliding in the ring 30. The rolls 27 are inactive in this position. If back pedaling is effected, the sleeve $m$ will, by means of its square surfaces 70, press the rolls firmly against the inner surface of the outer hub casing, and is thus forced to follow the revolution of the same. The projections $z$ will then slide up the oblique surface of the ring 9 and thereupon further on the oblique surface of the inner casing $d$, Fig. 6, until the sleeve $m$ with the rolls 27 are displaced so far to the left that the rolls 27 come out of engagement with the outer hub casing $x$ and are pushed into the ring 30, Fig. 5. The projection 32 on the ring 28 is hereby removed from the notch in the inner hub casing $d$, and the ring 28 can thereafter be turned in relation to the sleeve $m$. If further back pedaling is effected the sleeve $m$ will press the rolls 27 against the inner surface of the ring 30, and the brake 59 is actuated. If, however, forward pedaling is effected after the rolls 27 have been displaced into the ring 30, the projections $z$ when actuated by the spring $s$ will slide down the oblique surface of the inner hub casing $d$, owing to the relative position of the part at the time and the shape of the parts, and remain in one of the less deep notches 33 in the edge of the ring 9. In this position of the parts, the projection 32 is removed from the notch in the inner hub casing $d$, and the sleeve $m$ can therefore be coupled to the outer hub casing. In this position the springy ring $n$ is out of engagement with the sleeve $h$, and the gear $g$ is therefore freely turnable on the shaft $a$, so that the intermediate gears cannot act to drive the outer hub. The ring 9 then turns in backward direction, shifting a tooth backward in relation to the part 8, so that the projections $z$ are now in the position $z^1$ shown in dotted lines in Fig. 6 and the low gear is now used in running.

Having thus described my invention and in what manner the same is operated, I claim:

1. In a bicycle gearing, the combination with a stationary axle having a threaded portion or worm, a sun gear loose on said axle, a sleeve on said axle having threaded engagement with said threaded portion and adapted to lock said sun gear to said axle, a revoluble wheel hub, a driving member geared to the wheel hub and sun gear, a friction sleeve connected to rotate with said driving member and adapted for engagement with said threaded sleeve to actuate the same for locking the sun gear on said shaft, a brake operable by said driving member, and means for rotating the friction sleeve independently of the brake for changing the ratio of transmission without braking.

2. A free wheel hub, providing a plurality of transmission ratios, in combination, an outer hub having an internal gear thereon, an inner hub, a planetary gear carried by said inner hub, and meshing with said internal gear, a fixed central shaft, a sun gear loosely mounted on said shaft and meshing with said planetary gear, a direct drive between said outer and inner hub, a brake operable by pedaling from said inner hub, and said inner hub being further operable independently of said brake for locking said sun gear to the shaft upon forward pedaling following upon back pedaling.

In testimony whereof I have affixed my signature in presence of two witnesses.

FREDERIK JOHANNES OLSEN.

Witnesses:
   VIGGO BLOM,
   CECIL VILHELM SCHON.

Copies of this patent may be obtained for five cents each, by addressing the " Commissioner of Patents, Washington, D. C."